July 16, 1946.    W. P. MASON    2,403,990
COMPRESSIONAL WAVE RADIATOR
Filed Aug. 1, 1942    4 Sheets-Sheet 1
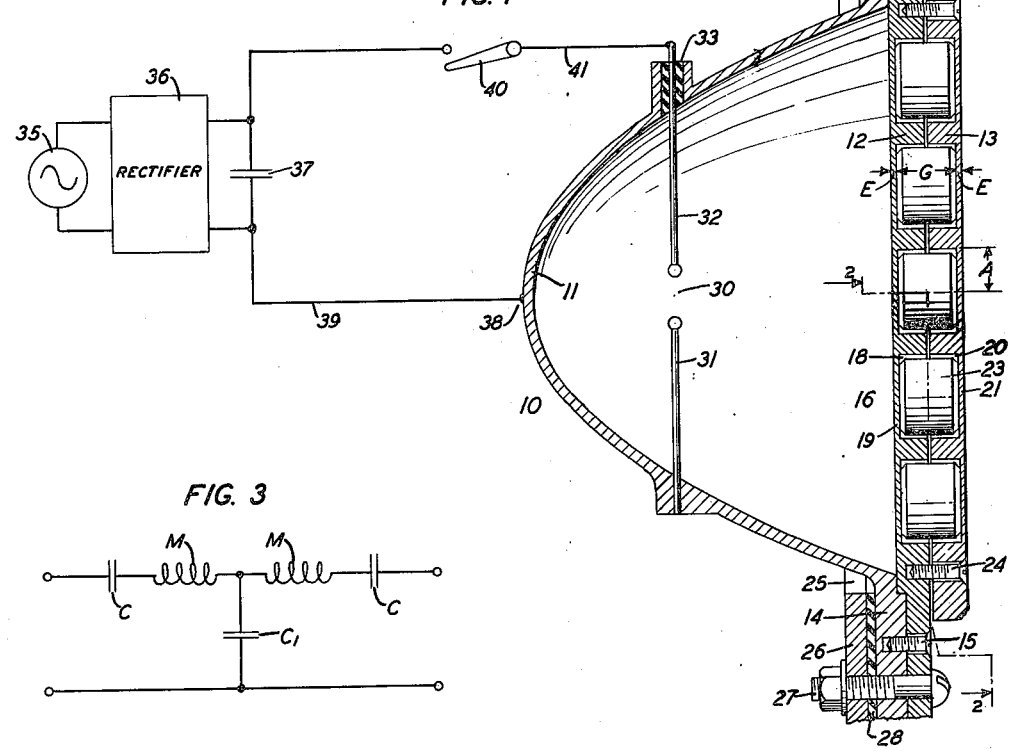
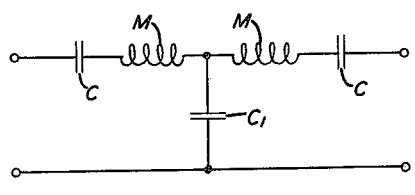
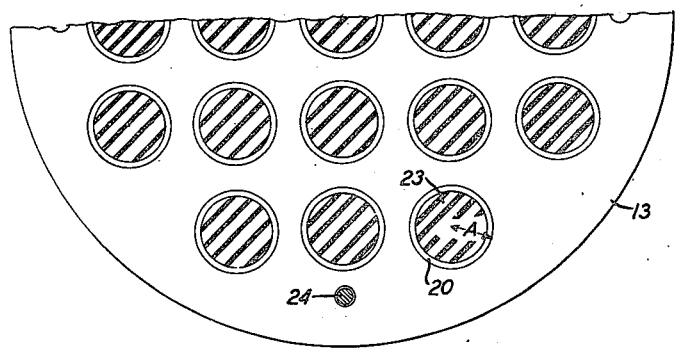
INVENTOR
W. P. MASON
BY
Ralph T. Holcomb
ATTORNEY July 16, 1946.  W. P. MASON  2,403,990
COMPRESSIONAL WAVE RADIATOR
Filed Aug. 1, 1942  4 Sheets-Sheet 2

INVENTOR
W. P. MASON
BY
Ralph T. Holcomb
ATTORNEY

July 16, 1946.   W. P. MASON   2,403,990
COMPRESSIONAL WAVE RADIATOR
Filed Aug. 1, 1942   4 Sheets-Sheet 3

INVENTOR
W. P. MASON
BY
Ralph T. Holcomb
ATTORNEY

July 16, 1946.  W. P. MASON  2,403,990
COMPRESSIONAL WAVE RADIATOR
Filed Aug. 1, 1942  4 Sheets-Sheet 4

INVENTOR
W. P. MASON
BY
Ralph T. Holcomb
ATTORNEY

Patented July 16, 1946

2,403,990

UNITED STATES PATENT OFFICE 2,403,990

COMPRESSIONAL WAVE RADIATOR

Warren P. Mason, West Orange, N. J., assignor to Bell Telephone Laboratories, Incorporated, New York, N. Y., a corporation of New York Application August 1, 1942, Serial No. 453,225

14 Claims. (Cl. 177—386)

This invention relates to submarine signaling and more particularly to a compressional wave radiator.

An object of the invention is to radiate compressional waves under water.

Another object is to convert a shock wave into a vibration of limited frequency range.

A further object is to increase the duration of the vibration radiated.

Another object of the invention is to increase the output of a compressional wave radiator falling within a limited band of frequencies.

Shock waves having large energies for a short period of time have been employed heretofore in submarine signaling systems. Such a shock wave has its energy spread quite uniformly over a very wide frequency range but, in a typical case, dies out in about two milliseconds. In some submarine signaling systems, however, there is required a compressional wave which will persist at a high energy level for a much longer time.

In accordance with the present invention there is provided a submarine compressional wave radiator which will deliver the required type of wave. The radiator comprises a water-tight container filled with liquid, means within the container for delivering a strong impulse to the liquid and filtering means associated with the container for transmitting therethrough a limited band of frequencies. The impulse may, for example, be generated by an electrical discharge through the liquid in the container. The filtering means preferably comprise a pair of metal diaphragms, rigidly supported at their peripheries, and an interposed layer of elastic material having a comparatively low Young's modulus. A satisfactory elastic material is resin, such, for example, as cellulose acetate or polymerized methyl methacrylate. The mid-band of the filter is placed at the frequency at which it is desired that the peak of energy shall occur. The band width is made sufficiently narrow to ensure the desired duration of the pulse, since the narrower the band the longer it will take for the output to die down to a given fraction of its initial value. In order to increase the power output of the radiator, more than one filter unit may be provided. The container may take the form of a parabola, a cylinder, a sphere or any other suitable shape.

The nature of the invention will be more fully understood from the following detailed description and by reference to the accompanying drawings, in which like reference characters refer to similar or corresponding parts and in which:

Fig. 1 shows, partly in section and partly diagrammatically, a parabolic type of compressional wave radiator in accordance with the invention;

Fig. 2 is a sectional view taken along the line 2—2 of Fig. 1;

Fig. 3 is a schematic circuit of the mechanical filter unit used in the radiator;

Figure 4:
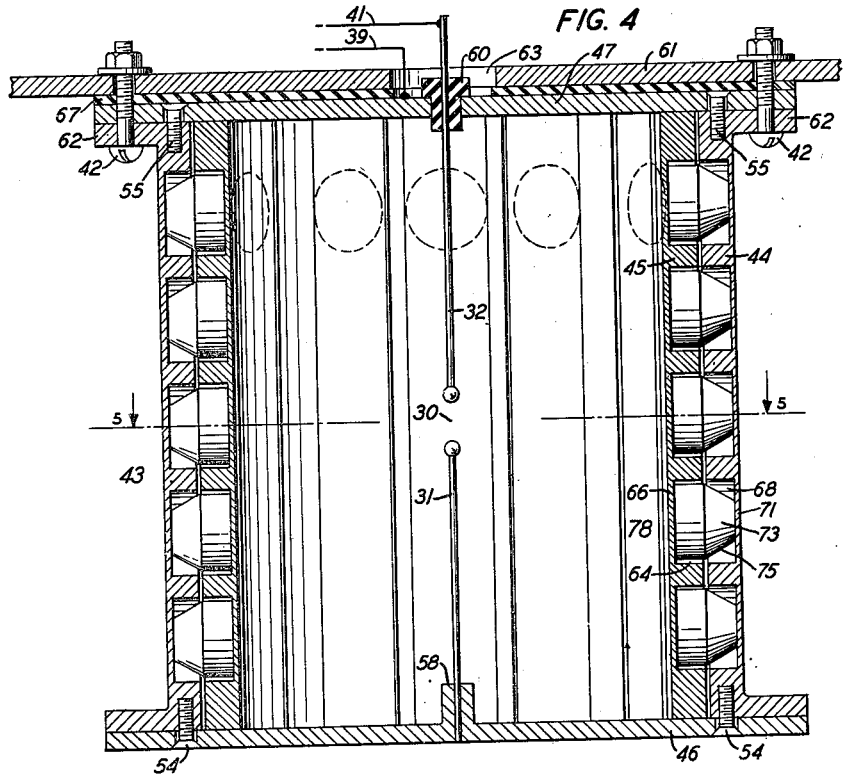
Fig. 4 is a sectional view of a cylindrical type of radiator.

Taking up the figures in more detail, Figs. 1 and 2 show a compressional wave radiator comprising a water-tight container 10 formed of a parabolic metallic reflector 11 closed by two circular metallic end plates 12 and 13. The reflector 11 has an annular flange 14 to which the inner plate 12 is secured by means of screws such as 15. A number of circular holes such as 18 are drilled in the outer side of the plate 12, leaving comparatively thin diaphragms 19 which are rigidly supported at their peripheries. A corresponding number of matching circular holes such as 20 are drilled in the inner side of the plate 13, leaving thin diaphragms 21. Between each pair of diaphragms 19 and 21 and cemented thereto is a cylindrical plug 23 made of an elastic material for which Young's modulus is comparatively low. Natural or synthetic resin such, for example, as cellulose acetate or polymerized methyl methacrylate is a suitable material. The plate 13 is fastened to the plate 12 by means of screws such as 24. The container 10 may, for example, be mounted on the side or bottom of a ship in such a way that the reflector 11 extends inside the ship through a hole 25 in the ship's plate 26, and it may be secured by means of bolts such as 27 which go through the ship's plate 26, the flange 14 and the plate 12. A gasket 28 prevents water from leaking through the joint.

The container 10 is filled with fresh or distilled water or other liquid having a comparatively high resistivity. The source of the impulse is an electrical discharge across the gap 30 between the ends of the electrodes 31 and 32 within the container 10. The electrode 31 is electrically connected to the reflector 11 but the electrode 32 is insulated therefrom by means of the insulator 33. The center of the gap 30 is placed at the focus of the parabolic reflector 11.

The required voltage is derived from the alternator 35, rectified by the rectifier 36 and used to charge the capacitor 37, one side of which is connected to the reflector 11 at the point 38 by the lead 39 and the other side of which is connected through the switch 40 and the lead 41 to the insulated electrode 32. When the switch 40 is closed there is impressed across the gap 30 a voltage sufficiently high to cause between the electrodes 31 and 32 an electrical discharge which delivers a strong impulse to the liquid within the container 11. This impulse is transmitted through the liquid to the inner plate 12.

A diaphragm 19 in the plate 12, a corresponding diaphragm 21 in the plate 13 and the interposed plug 23 constitute a mechanical wave filter 16 the equivalent T network of which is shown schematically in Fig. 3. Each series impedance branch comprises a compliance C, furnished by the diaphragm 19 or 21, and a mass M. The interposed shunt impedance branch is constituted by a compliance $C_1$ furnished by the plug 23. The mass M is equal to the sum of two masses $M_1$ and $M_2$, where $M_1$ is equal to half the mass of the plug 23 and $M_2$ is the equivalent mass of the diaphragm 19 or 21. In accordance with well-established practice the electrical symbol for capacitance is used for the compliances C and $C_1$ and the symbol for inductance is used for the mass M.

The values of C, $C_1$ and $M_2$, in mechanical units, may be found from the following equations:

$$C = \frac{A^4(1-B^2)}{16DE^3F} \quad (1)$$

$$C_1 = \frac{G}{DH} \quad (2)$$

$$M_2 = \frac{9}{5}DEK \quad (3)$$

in which A is the radius, D the area, E the thickness and K the density of the diaphragm 19 or 21, B is Poisson's ratio and F Young's modulus therefor, and G is the thickness of, and H Young's modulus for, the plug 23.

The filter 16 may be designed to have a transmission band between a lower cut-off frequency $f_1$ and an upper cut-off frequency $f_2$ by giving the elements C, $C_1$ and M the following values:

$$C = \frac{f_2 - f_1}{4\pi f_1^2 Z} \quad (4)$$

$$C_1 = \frac{1}{\pi(f_1 + f_2)Z} \quad (5)$$

$$M = \frac{Z}{2\pi(f_2 - f_1)} \quad (6)$$

where Z is the characteristic impedance of the filter at its mid-band frequency $f_m$, defined as the geometric mean of the cut-off frequencies $f_1$ and $f_2$. To avoid reflection effects the impedance Z should match the load impedances between which the filter operates.

The function of the filter units 16 is to convert the shock wave generated within the container 10 into a vibration of longer duration but limited frequency range, with its energy peaked at some chosen frequency. An analysis of the behavior of a shock wave impressed upon a band-pass filter shows that the output vibration will be confined mainly to the band between $f_1$ and $f_2$, will have its energy peaked in the vicinity of the mid-band frequency $f_m$ and will persist for a time which is inversely proportional to the band width. The mid-band frequency $f_m$ is, therefore, chosen to coincide with the desired frequency of the energy peak and the band width is made sufficiently narrow to ensure the required duration of the output vibration. The number of filter units 16 depends upon the power required to be radiated. The radiator shown in Figs. 1 and 2 has 21 of these units.

Figure 5:
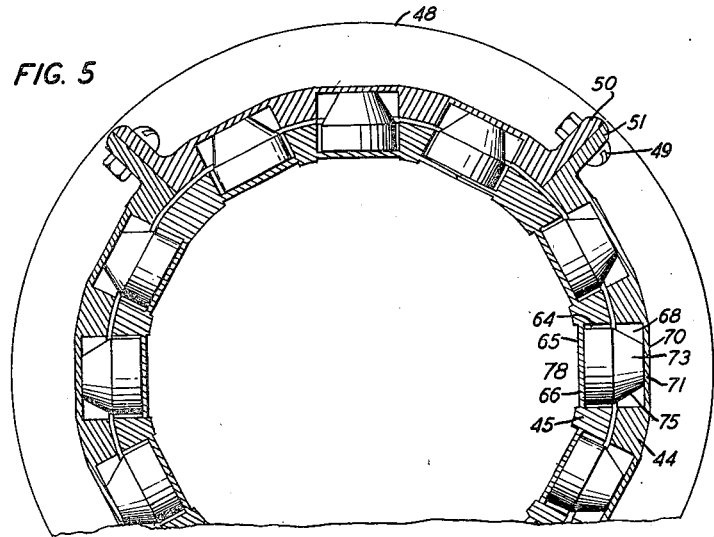
Fig. 5 is a sectional view taken along the line 5—5 of Fig. 4.

Fig. 4 is a sectional view of a cylindrical type of compressional wave radiator, and Fig. 5 is a sectional view taken along the line 5—5 of Fig. 4. Here the water-tight container 43 is formed of two concentric cylindrical shells 44, 45 and two end plates 46, 47. To facilitate assembly, the outer shell 44 is made in four quadrants such as 48 fastened together by means of bolts 49 through the adjacent flanges 50 and 51, as shown in Fig. 5. The end plate 46 is fastened to the outer cylinder 44 by means of screws such as 54 and the end plate 47 is fastened thereto by means of screws such as 55. The electrode 31 is mounted in a central boss 58 in the end plate 46 and the opposite electrode 32 extends through an insulator 60 in a central hole in the other end plate 47 to form a gap having its center 30 at the center of the container 43. The assembly is mounted on the outside of a ship by means of the bolts 42 which go through the ship's plate 61, the end plate 47 and an annular flange 62 on the outer shell 44. A hole 63 in the ship's plate 61 permits electrical connections to be made to the end plate 47 and the insulated electrode 32 by means of the lead wires 39 and 41, respectively, from a voltage source of the type shown in Fig. 1. The gasket 67 keeps the water out of the ship.

The inner shell 45 has a number of circular holes 64 drilled in from the outside and it is milled off flat on the inside as shown at 65 to form a number of inner diaphragms 66. Corresponding holes 68 are drilled in the outer shell 44 from the inside and it is milled off flat on the outside as shown at 70 to form the outer diaphragms 71. Between each pair of diaphragms 66 and 71, and cemented thereto, is a cylindrical elastic plug 73 having its outer corner beveled as shown at 75 to facilitate assembly of the four quadrants 48 of the outer shell 44. Each pair of diaphragms 66 and 71 and the interposed plug 73 form a mechanical filter unit 78 which may be designed in the same manner as explained above in connection with the unit 16 of Fig. 1 to have the desired mid-band frequency $f_m$, cut-off frequencies $f_1$ and $f_2$ and characteristic impedance Z. The radiator just described is less directive in its radiating properties than is the one shown in Figs. 1 and 2 since it covers an arc of 360 degrees.

Figure 6:
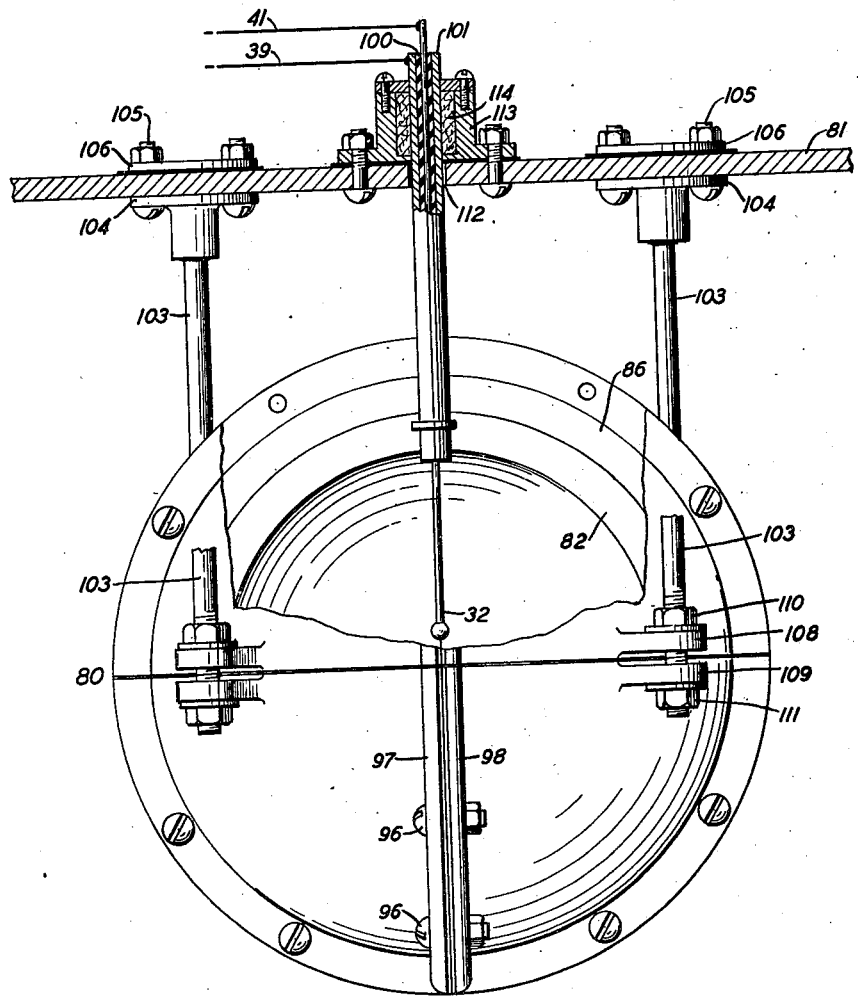
Fig. 6 is a view, partly in section, of a spherical type of radiator.
Figure 7:
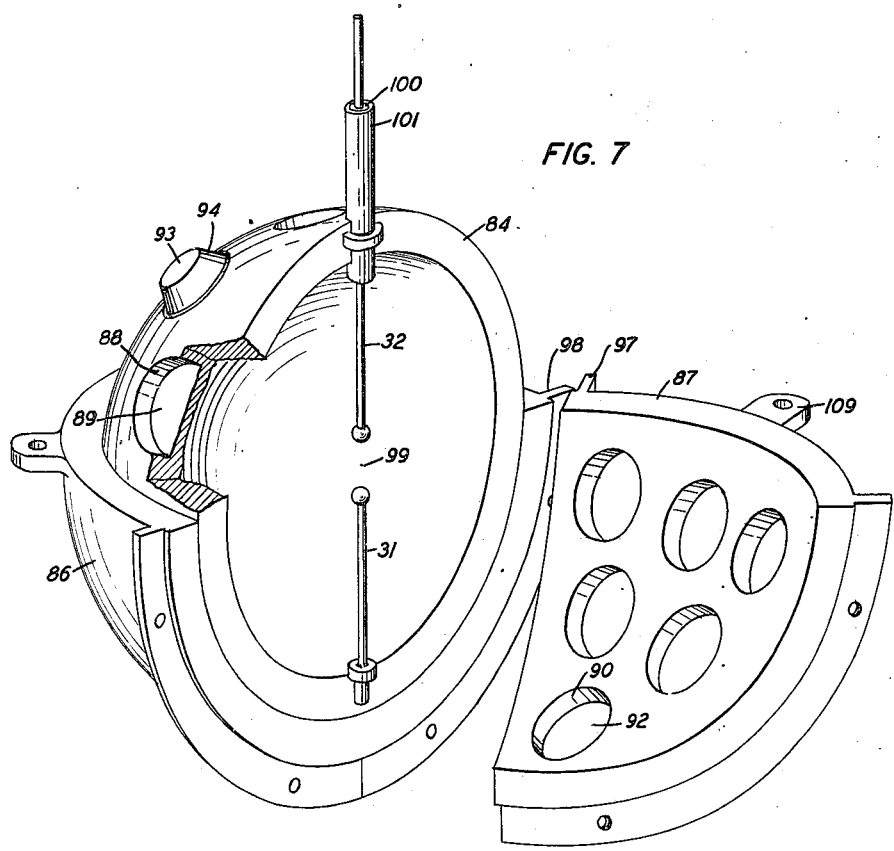
Fig. 7 is a perspective view, partly exploded, of parts of the radiator of Fig. 6.

Figs. 6 and 7 show a radiator of the spherical type. Fig. 6 is a side view, partly cut away and partly in section, showing the water-tight spherical container 80 attached to the outside of the ship's plate 81 and Fig. 7 is a perspective view, partially exploded, showing certain of the parts. The container 80 comprises a hollow spherical inner shell 82, made up of two hemispherical sections such as 84, and a spherical outer shell 86, made in eight sections, such as 87. The inner shell 82 has a number of circular holes 88 drilled part way through from the outside to form the diaphragms 89 and the outer shell 86 has a corresponding number of matching holes 90 drilled part way through from the inside to form the diaphragms 92. Between each pair of diaphragms 89 and 92, and cemented thereto, is a cylindrical elastic plug 93, similar to the plugs 23 and 73 described above. The plug 93 has its outer corner beveled as shown at 94 to facilitate assembly. The diaphragms 89 and 92 and the interposed plug 93 form a mechanical filter unit similar to the units 16 and 78, already described, and it may be designed in the same way. All of the shell sections are bolted together by means of bolts such as 96 through adjacent flanges such as 97 and 98 to form a water-tight hollow sphere 80.

Within the container 80 are two electrodes 31 and 32 separated by a gap the center 99 of which is at the center of the sphere. The electrode 31 is electrically connected to the inner shell 82 but the electrode 32 is insulated from the container 80 by means of the tubular insulator 100 within the protecting tube 101. The leads 39 and 41 from the voltage source are connected, respectively, to the tube 101 and the electrode 32.

The container 80 is suspended from the ship's plate 81 by means of four rods 103, each of which is secured at one end to an outer plate 104 and is held in place by means of the four bolts 105 which go through the outer plate 104, the ship's plate 81 and the inner plate 106. The other end of the rod 103 goes through holes in the lugs 108 and 109 associated, respectively, with the upper half and the lower half of the outer shell 86 and, with the aid of the nuts 110 and 111, holds the two halves of the shell 86 together. The tube 101 enters the ship through a hole 112 in the plate 81 made water-tight by means of the packing box 113 and packing material 114.

The spherical type of compressional wave radiator shown in Figs. 6 and 7 has some advantages over the other types of radiators disclosed herein. Since the shock wave is generated at the center 99 of the inner spherical shell 82 it sets up a spherical compressional wave which reaches all the filter units, and all portions of each inner diaphragm 89, at the same time and in the same phase. The output energy from all of the filter units will, therefore, be in phase and possible interference between units will be avoided. A further advantage is that the output energy from the radiator will also be very nearly a spherical wave and will be radiated in all directions with substantially equal intensity.

What is claimed is:

1. A compressional wave radiator comprising a water-tight container, liquid within said container, means for delivering a strong impulse to said liquid and filtering means associated with said container for transmitting therethrough a band of frequencies while attenuating frequencies outside of said band, said filtering means including a plurality of mechanical filter units and each of said units comprising two diaphragms rigidly supported at their peripheries and an interposed layer of elastic material having a comparatively low Young's modulus.

2. A compressional wave radiator in accordance with claim 1 in which a plurality of said filter units are located substantially equidistantly from the point of delivery of said impulse.

3. A compressional wave radiator comprising a water-tight container, liquid within said container, means for delivering a strong impulse to said liquid and filtering means associated with said container for transmitting therethrough a band of frequencies while attenuating frequencies outside of said band, a portion of said container being constituted by an inner wall and an outer wall, said inner wall having a number of holes extending part way through from the outside to leave comparatively thin inner diaphragms, said outer wall having the same number of matching holes extending part way through from the inside to leave comparatively thin outer diaphragms and said filtering means including elastic plugs inserted respectively between said inner diaphragms and the corresponding outer diaphragms.

4. A compressional wave radiator comprising a parabolic reflector, an inner plate and an outer plate closing said reflector to make a water-tight container, liquid within said container, means for delivering a strong impulse to said liquid near the focus of said parabolic reflector and a plurality of mechanical filter units associated with said plates for transmitting therethrough a band of frequencies while attenuating frequencies outside of said band, each of said filter units comprising two diaphragms rigidly supported at their peripheries and an interposed layer of elastic material having a comparatively low Young's modulus.

5. A compressional wave radiator comprising a parabolic reflector, an inner plate and an outer plate closing said reflector to make a water-tight container, liquid within said container, means for delivering a strong impulse to said liquid near the focus of said parabolic reflector and a plurality of mechanical filter units associated with said plates for transmitting therethrough a band of frequencies while attenuating frequencies outside of said band, said inner plate having a number of holes extending part way through from the outside to leave comparatively thin inner diaphragms, said outer plate having the same number of matching holes extending part way through from the inside to leave comparatively thin outer diaphragms and each of said filter units including an elastic plug inserted between one of said inner diaphragms and the corresponding outer diaphragm.

6. A compressional wave radiator in accordance with claim 4 in which a plurality of said filter units are located substantially equidistantly from the point of delivery of said impulse.

7. A compressional wave radiator comprising an inner cylindrical wall, an outer cylindrical wall, end plates closing said cylindrical walls to make a water-tight container, liquid within said container, means for delivering a strong impulse to said liquid near the center of said container and a plurality of mechanical filter units associated with said cylindrical walls for transmitting therethrough a band of frequencies while attenuating frequencies outside of said band, each of said filter units comprising two diaphragms rigidly supported at their peripheries and an interposed layer of elastic material having a comparatively low Young's modulus.

8. A compressional wave radiator comprising an inner cylindrical wall, an outer cylindrical wall, end plates closing said cylindrical walls to make a water-tight container, liquid within said container, means for delivering a strong impulse to said liquid near the center of said container and a plurality of mechanical filter units associated with said cylindrical walls for transmitting therethrough a band of frequencies while attenuating frequencies outside of said band, said inner cylindrical wall having a number of holes extending part way through from the outside to leave comparatively thin inner diaphragms, said outer cylindrical wall having the same number of matching holes extending part way through from the inside to leave comparatively thin outer diaphragms and each of said filter units including an elastic plug inserted between one of said inner diaphragms and the corresponding outer diaphragm.

9. A compressional wave radiator in accordance with claim 7 in which a plurality of said filter units are located substantially equidistantly from the point of delivery of said impulse.

10. A compressional wave radiator comprising a hollow spherical inner shell and a spherical outer shell constituting a water-tight container, liquid within said container, means for delivering a strong impulse to said liquid near the center of said container and a plurality of mechanical filter units associated with said shells for transmitting therethrough a band of frequencies while attenuating frequencies outside of said band, each of said filter units comprising two diaphragms rigidly supported at their peripheries and an interposed layer of elastic material having a comparatively low Young's modulus.

11. A compressional wave radiator comprising a hollow spherical inner shell and a spherical outer shell constituting a water-tight container, liquid within said container, means for delivering a strong impulse to said liquid near the center of said container, and a plurality of mechanical filter units associated with said shells for transmitting therethrough a band of frequencies while attenuating frequencies outside of said band, said inner shell having a number of holes extending part way through from the outside to leave comparatively thin inner diaphragms, said outer shell having the same number of matching holes extending part way through from the inside to leave comparatively thin outer diaphragms and each of said filter units including an elastic plug inserted between one of said inner diaphragms and the corresponding outer diaphragm.

12. A compressional wave radiator in accordance with claim 10 in which a plurality of said filter units are located substantially equidistantly from the point of delivery of said impulse.

13. A wave filtering device comprising an inner plate, an outer plate and a plurality of plugs of elastic material having a comparatively low Young's modulus, said inner plate having a number of holes extending part way through from the outside to leave comparatively thin inner diaphragms, said outer plate having the same number of matching holes extending part way through from the inside to leave comparatively thin outer diaphragms and said plugs being inserted, respectively, between said inner diaphragms and the corresponding outer diaphragms.

14. A wave filtering device in accordance with claim 13 in which said plugs are cemented to said diaphragms.

WARREN P. MASON.